United States Patent [19]

Roth

[11] Patent Number: 4,543,854
[45] Date of Patent: Oct. 1, 1985

[54] DIFFERENTIAL GEAR MECHANISM
[75] Inventor: Jan Roth, Angered, Sweden
[73] Assignee: AB Volvo, Goteborg, Sweden
[21] Appl. No.: 569,461
[22] Filed: Jan. 5, 1984
[30] Foreign Application Priority Data
Jan. 11, 1983 [SE] Sweden ................. 8300100
[51] Int. Cl.⁴ ............. F16H 1/40; F16H 1/38
[52] U.S. Cl. ................... 74/713; 74/710
[58] Field of Search .......... 74/710, 713, 665 T
[56] References Cited
U.S. PATENT DOCUMENTS

| 1,136,644 | 4/1915 | Besserdich | 74/713 |
| 2,267,562 | 12/1941 | Higgins | 74/713 X |
| 3,505,904 | 4/1970 | Williams, Jr. | 74/710 X |
| 4,077,279 | 3/1978 | Goscenski, Jr. | 74/711 |
| 4,304,317 | 12/1981 | Vanzant et al. | 74/713 X |

FOREIGN PATENT DOCUMENTS 2839198  3/1980  Fed. Rep. of Germany ........ 74/713

Primary Examiner—George H. Krizmanich
Assistant Examiner—Dirk Wright
Attorney, Agent, or Firm—Young & Thompson

[57] ABSTRACT

An intermediate shaft differential for vehicles has two drive axles. The differential side pinions of the gear mechanism are fixed radially on the spider by means of a ring which surrounds the spider. The ring is not fixed to the spider and has an abutment surface adjacent to an abutment surface on one of the differential side gears to prevent tipping of the ring.

2 Claims, 1 Drawing Figure

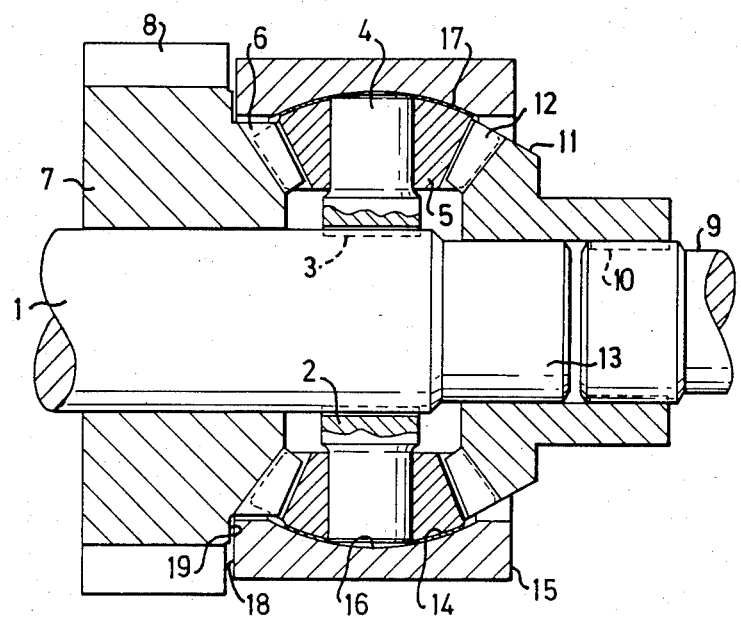

DIFFERENTIAL GEAR MECHANISM

The present invention relates to a differential gear mechanism, comprising a side pinion carrier which is non-rotatably joined to a first shaft and has radially directed cross shafts on which bevelled side pinions with part-spherical outer contours are rotatably journalled; a first bevelled side gear which is freely rotatably journalled on the first shaft and engages the bevelled side pinions; a second side gear which is non-rotatably joined to a second shaft and engages the side pinions; and an outer ring which surrounds the side pinion carrier and the side pinions and has a part-spherical interior contour which conforms to the outer contours of the side pinions.

Differential gear mechanisms having a side pinion carrier in the form of a spider mounted directly on an input shaft are used, among other things, as intermediate gear mechanisms or dividing gear mechansims in motor vehicles with dual drive axles to distribute the torque between the drive axles, for example between so-called tandem rear axles in a truck or between the front and rear axles in a four-wheel drive vehicle.

In the present type of differential gear mechanism, the outer ring only serves to axially fix the differential side pinions on the spider shaft journals while, in comparison, the differential case in a conventional drive shaft differential, which distributes the driving torque between right and left driving wheels, also serves to transmit torque from the propeller shaft via the crown gear to the spider. Nevertheless, in dividing gear mechanisms the outer ring is most commonly made in principle in the same manner as the differential case in a common rear axle differential, i.e. two halves with reamed seats for the journal ends of the spider cross shafts. After mounting the spider between the halves of the ring, said halves are screwed, riveted or welded together to form a ring with a spherical interior surface, which determines the radial position of the differential side pinions. This design is relatively expensive since it requires machining and assembly of a number of parts.

Another known, somewhat less expensive design uses an undivided ring with radial bores with pins therein which are inserted into corresponding bores in the journal ends of the cross shafts and are urged radially outwards by helical springs in the bores in the cross shafts. If these pins are broken off, which can occur due to inertial forces, the result will be a complete breakdown. Lubricating oil leaks through the bores in the outer ring, resulting in poor lubrication of the thrust washers between the side pinions and the outer ring. This in turn often leads to the washers "eating their way" into the outer ring, thereby changing the prescribed relative positions of the teeth in the engaging differential side pinions and gears.

The purpose of the present invention is to achieve a differential gear mechanism of the type described in the introduction which is simpler and less expensive than the above-mentioned known design, but which still fulfills the highest requirements of operational reliability.

This is achieved according to the invention by a differential gear mechanism which is characterized in that the outer ring is not fixed to the side pinion carrier and has, in order to prevent tipping of the ring relative to the other components, an abutment surface adjacent to an abutment surface which is fixed axially relative to the shafts.

This design provides the simplest conceivable manufacture and assembly, thus making this design less expensive than previously known designs. The absence of through-bores in the ring causes the lubricating oil to remain within the sphere and lubricate the thrust washers. By virtue of the fact that the ring is not fixed to the spider cross shafts, and the side pinions can change their position relative to the ring, the interior spherical surface of the ring will not be subjected to localized wear.

The invention will be described in more detail with reference to an example shown in the accompanying drawings, which shows a longitudinal section through an embodiment of a differential gear mechanism according to the invention.

In the FIGURE, 1 designates a first shaft on which a spider 2 is non-rotatably mounted by means of splines 3. Bevelled differential side pinions 5 are rotatably journalled on the journals 4 of the spider cross shafts, and have teeth which engage the teeth in a bevel gear ring 6 on a side gear 7 freely rotatably journalled on the shaft 1. Said side gear 7 also has a cylindrical set of gear teeth 8. A second shaft 9 is non-rotatably joined by splines 10 to a side gear 11 with a bevel gear ring 12 engaging the differential side pinions 5. The side gear 11 is rotatably journalled on a journal end 13 of the shaft 1 and forms together with the gear 7 the differential side gears.

When the gear mechanism described is used as an intermediate differential in a four-wheel drive vehicle, the shaft 1 is driven by the propeller shaft from the ordinary vehicle gearbox. The shaft 9 is coupled to one axle differential and the gear 7 is coupled to the other axle differential via a gear (not shown) which engages the gear teeth 8.

The side pinions 5 are made in a conventional manner with spherical outer surfaces 14 and, in accordance with the invention, are surrounded by a homogeneous, undivided ring 15 with an interior surface 16 which conforms to the spherical outer surfaces 14 of the side pinions. Thrust and bearing washers 17 are placed between the ring 15 and the side pinions 5. As can be seen from the FIGURE, the ring 15 has an end surface 18 which is placed a small distance from an end surface 19 on the gear 7. The surfaces 18 and 19 form abutments which prevent the ring from tipping, which means that the ring will be axially fixed in the position shown after mounting the gear 7 on the shaft 1.

What I claim is:

1. Differential gear mechanism, comprising a side pinion carrier which is non-rotatably joined to a first shaft and has radially directed cross shafts on which bevelled side pinions with part-spherical outer contours are rotatably journalled; a first bevelled side gear which is freely rotatably journalled on the first shaft and engages the bevelled side pinions; a second side gear which is non-rotatably joined to a second shaft and engages the side pinions; and an outer ring which surrounds the side pinion carrier and the side pinions and has a part-spherical interior contour which conforms to the outer contours of the side pinions; characterized in that the outer ring is not fixed to the side pinion carrier and has, in order to prevent tipping of the ring relative to the other components, an abutment surface adjacent to an abutment surface which is fixed axially relative to the shafts.

2. Differential gear mechanism according to claim 1, characterized in that the end surface on the outer ring forms one abutment surface and a radial end surface on the first side gear or on an element non-rotatably joined to said side gear forms the other abutment surface.

* * * * *